United States Patent
Subramanyam et al.

(10) Patent No.: US 9,611,055 B2
(45) Date of Patent: Apr. 4, 2017

(54) CONTEXT BASED CONTENT DISPLAY IN A WEARABLE DEVICE

(71) Applicant: HONEYWELL INTERNATIONAL INC., Morristown, NJ (US)

(72) Inventors: Rajesh Vecham Subramanyam, Karnataka (IN); Preetham Keerthi Raveendra, Karnataka (IN); Shankar Vankipuram Rangaraj, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/539,334

(22) Filed: Nov. 12, 2014

(65) Prior Publication Data

US 2016/0130018 A1 May 12, 2016

(51) Int. Cl.
| | | |
|---|---|---|
| *B64F 5/00* | (2006.01) | |
| *G06F 1/16* | (2006.01) | |
| *G06Q 10/06* | (2012.01) | |
| *G06Q 10/00* | (2012.01) | |

(52) U.S. Cl.
CPC .......... *B64F 5/0081* (2013.01); *G06F 1/163* (2013.01); *G06Q 10/06* (2013.01); *G06Q 10/20* (2013.01); *G05B 2219/32014* (2013.01)

(58) Field of Classification Search
USPC .......... 701/29.1–29.4, 29.7, 29.9, 31.4, 31.5, 701/33.2; 714/100, 25, 31, 46
See application file for complete search history.

(56) References Cited

U.S. PATENT DOCUMENTS

| | | | |
|---|---|---|---|
| 7,936,285 B2 | 5/2011 | Kneller et al. | |
| 8,472,120 B2 | 6/2013 | Border et al. | |
| 8,947,322 B1* | 2/2015 | Chi | G02B 27/017 345/156 |
| 9,088,787 B1* | 7/2015 | Smith | H04N 13/0278 |
| 2007/0100583 A1 | 5/2007 | Yano et al. | |
| 2010/0153881 A1* | 6/2010 | Dinn | G06F 17/30572 715/825 |
| 2011/0202351 A1 | 8/2011 | Plocher et al. | |
| 2014/0022281 A1 | 1/2014 | Georgeson et al. | |
| 2014/0232534 A1* | 8/2014 | Birnbaum | G06F 3/016 340/407.1 |
| 2014/0281712 A1* | 9/2014 | Subbu | G06F 11/26 714/25 |
| 2014/0288992 A1 | 9/2014 | Wetzer et al. | |

(Continued)

FOREIGN PATENT DOCUMENTS

CN 102795349 A 11/2012

OTHER PUBLICATIONS

Extended EP Search Report for Application No. 15193086.4-1955 dated Mar. 24, 2016.

(Continued)

*Primary Examiner* — Yonel Beaulieu
(74) *Attorney, Agent, or Firm* — Lorenz & Kopf, LLP

(57) ABSTRACT

Methods and systems are provided for managing content displayed by a wearable device. In one embodiment, a method includes: determining a current context of the wearable device; determining a step of a process based on the context; determining an interface based on the step of the process; and generating display data to display the interface by the wearable device.

14 Claims, 4 Drawing Sheets

(56) References Cited

U.S. PATENT DOCUMENTS

2015/0106221 A1* 4/2015 Tapley .................. G06Q 30/08
                                                    705/26.3
2016/0080936 A1* 3/2016 Rachuri ................ H04W 12/06
                                                    726/7
2016/0094563 A1* 3/2016 Arsanjani ............. H04L 63/107
                                                    726/4

OTHER PUBLICATIONS

Lumus—Future Video-Eyeglasses; Sight of death—a brief history of military head-mounted display; 2013 Copyright, Retrieved from Internet [http://thefutureofthings.com/3073-lumus-future-video-eyeglasses].

* cited by examiner

CONTEXT BASED CONTENT DISPLAY IN A WEARABLE DEVICE

TECHNICAL FIELD

The present disclosure generally relates to methods and systems for managing content displayed to a user, and more particularly relates to methods and systems for managing content displayed to a user through a wearable device based on a determined context.

BACKGROUND

Line maintenance refers to scheduled checks that prepare an aircraft for a next flight, minor unscheduled repairs due to unforeseen events, or repairs between successive flights. Line maintenance technicians typically perform the following tasks: obtain information on aircraft arrival and location\bay; plan for maintenance tools and accessories before aircraft arrival; collect known fault information; collect supporting maintenance/fault isolation procedures; marshal the aircraft at the maintenance location\bay; perform all pre-flight checks; collect fault information from a flight log and from the pilot; coordinate procurement of parts to be replaced; repair systems that affect airworthiness or those not listed in MEL (Minimum Equipment List) if any fault reported; and report maintenance activities performed. The line maintenance technicians are required to perform all of such activities before the aircraft's next scheduled departure.

Currently, maintenance technicians complete these activities manually. Hence, there is a need for improved systems and methods for managing content displayed to a user through the maintenance process to improve the service provided by the technician. Other desirable features and characteristics will become apparent from the subsequent detailed description and the appended claims, taken in conjunction with the accompanying drawings and the foregoing technical field and background.

BRIEF SUMMARY

Methods and systems are provided for managing content displayed by a wearable device. In one embodiment, a method includes: determining a current context of the wearable device; determining a step of a process based on the context; determining an interface based on the step of the process; and generating display data to display the interface by the wearable device.

In another embodiment, a system includes a wearable device comprising a display device and at least one input device that accepts user input. The wearable device is configured to determine a current context of the wearable device; determine a step of a process based on the context; determine an interface based on the step of the process; and generate display data to display the interface by the wearable device.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
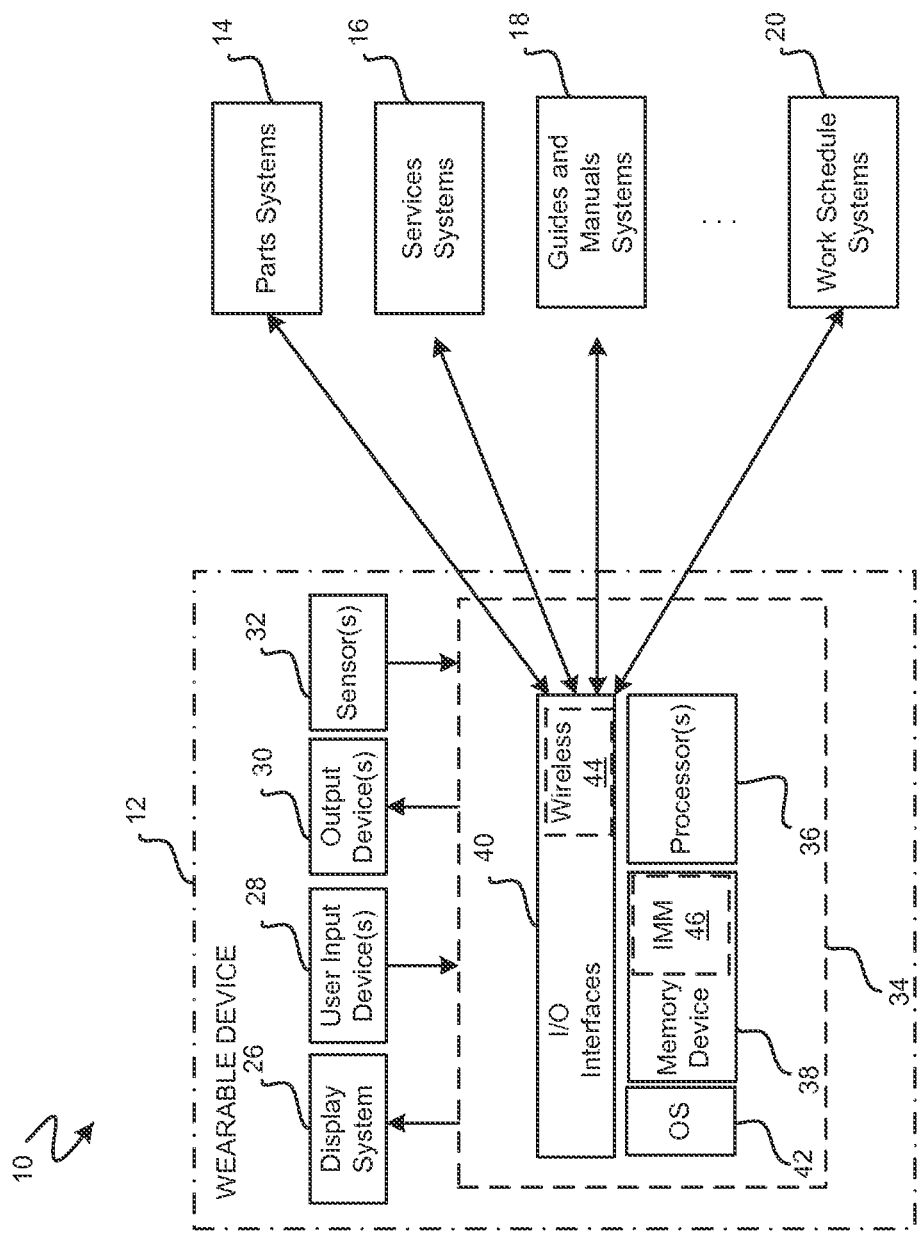
FIG. 1 is a functional block diagram illustrating a context based information management system in accordance with exemplary embodiments.

Referring now to FIG. 1, exemplary embodiments of the present disclosure are directed to a context based information management system, shown generally at 10, for managing the presentation of information to a technician during a maintenance procedure. As can be appreciated, context based information management systems 10 of the present disclosure may be implemented for any system requiring maintenance and is not limited to any one example. For exemplary purposes, various embodiments will be discussed in the context of maintenance of an aircraft. Although the figures shown herein depict an example with certain arrangements of elements, additional intervening elements, devices, features, or components may be present in actual embodiments. It should also be understood that FIG. 1 is merely illustrative and may not be drawn to scale.

The context based information management system 10 generally includes a wearable device 12 that presents information to a user based on a context of the wearable device 12. The context includes circumstances that surround the wearable device 12. In various embodiments, the wearable device 16 receives the information to be presented to the user from one or more information systems 14-20 associated with the aircraft. For example, the wearable device 12 wirelessly communicates with the one or more of the information systems 14-20 associated with the aircraft to obtain the information to be presented. The information systems 14-20 include information that is used by a technician when performing maintenance on an aircraft. Such systems may include, but are not limited to, parts and services systems, guides and manuals systems, works schedule systems, ERP systems including inventory management systems and logistics management systems.

In various embodiments, the wearable device 12 may be any device that is wearable by a user such as, but not limited to, a wrist band, eyewear, jewelry, a hair accessory, an article of clothing, and footwear, etc. In the exemplary embodiments discussed herein, the wearable device 12 includes eyeglasses that are wearable by a user and that include an integrated display system 26, one or more input devices 28, one or more output devices 30, one or more sensor devices 32, and a computing system 34. The input devices 28 can include, but are not limited to a touch pad, one or more depressible buttons, one or more switches, a recording device, and/or any other type of device capable of accepting and interpreting user input. The output devices 30 can include, but are not limited to, an audio device, a haptic device, and/or any other type of device for presenting information and/or notifications to a user. The sensor devices 32 include sensors for sensing information for determining the context of the wearable device 12 such as, but not limited to, location sensors (e.g., GPS system), image sensors, and timers. The display system 26 includes a display device and a projection device that displays content on the display device based on information received from the computing system 34. In the case of eyeglasses, the display device is a lens or display piece in front of an eyeglass lens.

The computing system 34 of the wearable device 12 generally includes processing hardware, such as a processor 36, a memory device 38, input/output interfaces 40 and the like, that are managed and accessed by a suitable operating system 42. The processor 36 may include one or more of microprocessors, microcontrollers, processing cores and/or other computing resources spread across any number of distributed or integrated systems. The memory device 38 may include any non-transitory short or long term storage capable of storing programming instructions for execution on the processor 36, such as, but not limited to, random access memory (RAM), read only memory (ROM), flash memory, magnetic or optical mass storage, and/or the like.

The input/output interfaces 40 may include software and/or hardware for communicating with the display system 26, for communicating with the input devices 28, for communicating with the output devices 30, for communicating with the sensor devices 32, and for communicating with the information systems 14-20. In particular, the input/output interfaces 40 include a wireless interface 44 for wirelessly communicating data to and wirelessly receiving data from the information systems 14-20 associated with the aircraft 14 according to a wireless communication protocol. In various embodiments, the wireless interface 44 communicates directly with the information systems 14-20 according to the wireless communication protocol. In various other embodiments, the wireless interface 44 communicates with a wireless access point (not shown) that is associated with one or more of the information systems 14-20 and the wireless access point communicates with the one or more information systems 14-20. In such embodiments, the wireless access point communicates with the information systems 14-20 according to a wired or a wireless protocol.

In various embodiments, the memory device 38 includes a context based information management module (IMM) 46. The context based information management module 46 contains instructions that, when executed by the processor 36, determine a context of the wearable device 12, request information based on the context of the wearable device 12, and present the information to the user based on the context of the wearable device 12. The instructions of the context based information management module 46 determine the context based on data provided by the sensor devices 32 and/or data provided by the user's interacting with the wearable device 12 via the input devices 28.

Figure 2:
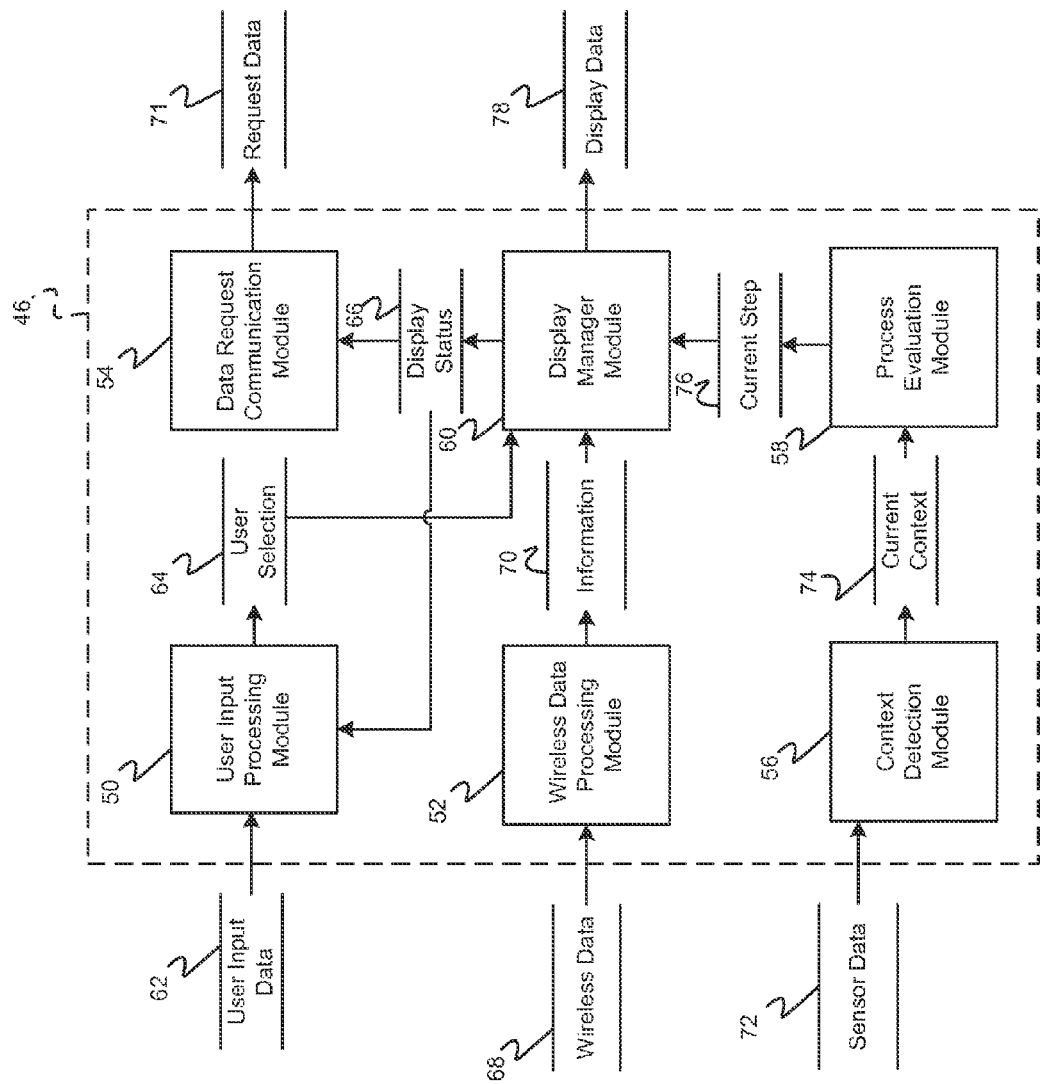
FIG. 2 is a dataflow diagram illustrating a context based information management system in accordance with exemplary embodiments.

Referring now to FIG. 2 and with continued reference to FIG. 1, a dataflow diagram illustrates various embodiments of the context based information management module 46 in greater detail. Various embodiments of context based information management modules 46 according to the present disclosure may include any number of sub-modules embedded within the context based information management module 46. As can be appreciated, the sub-modules shown in FIG. 2 may be combined and/or further partitioned to similarly determine a context of the wearable device 12 and to present information based on the context. Inputs to the context based information management module 46 may be received from the input/output interfaces 40, and/or from other sub-modules (not shown) within the context based information management module 34. In various embodiments, the context based information management module 46 includes a user input processing module 50, a wireless data processing module 52, a data request communication module 54, a context detection module 56, a process evaluation module 58, and a display manager module 60.

The user input processing module 50 receives as input user input data 62. The user input data 62 may be generated based on a user's interaction with one or more of the input devices 28. For example, the user input data 62 can include speech recorded by the recording device, or be based on position or activation signals generated by the touch pad, the depressible buttons and/or the switches.

The user input processing module 50 processes the user input data 62 to determine a user selection 64. In particular, the user input processing module 50 receives a display status 66 from the display manager module 60. The display status 66 indicates a current interface that is being displayed. The user input processing module 50 determines available options given the current interface, and processes the user input data 62 to determine the user selection 64 of one or more of the options. For example, if the user input data 62 includes speech data, the user input processing module 50 performs speech recognition methods on the speech data and identifies the user selection 64 by matching the recognized speech to one of the options. In another example, if the user input data 62 includes touch pad data, the user input processing module 50 processes the touch pad data to determine selected coordinates on the user interface and matching the selected coordinates to one of the options displayed at the coordinates. As can be appreciated, other methods of processing user input data 62 are contemplated and thus, the user input processing module 50 is not limited to the present examples.

The wireless data processing module 52 receives as input wireless data 68. As discussed above, the wireless data 68 is communicated to the context based information management module 46 from one or more of the information systems 14-20. The wireless data processing module 52 processes the wireless data 68 to determine the information 70 that is to be presented to the user. For example, an information system 14-20 may transmit wireless data 68 including scheduled maintenance tasks, aircraft logs, maintenance procedures, maintenance manuals, maintenance checklists or guides, resource quantity, location, and availabilities or any other information that may be useful to a technician during a maintenance procedure.

The data request communication module 54 receives as input the user selection 64 and the display status 66. Based on the user selection 64, the data request communication module 54 generates request data 71 for wirelessly communicating to the information systems 14-20. In various embodiments, the request data 71 includes a request for information about a particular system. In various embodiments, the request data 71 includes a request for certain products are services to be available at a location.

The context detection module 56 receives as input sensor data 72. The sensor data 72 may be generated by one or more of the sensor devices 32. For example, the sensor data 72 can indicate a current location of the wearable device. In another example, the sensor data 72 can include image data that includes an image of the current location of the wearable device 12. Based on the sensor data 72, the context detection module 56 determines a context 74 of the wearable device 12. For example, the context can indicate a particular location (e.g., a security booth), can indicate in transit to a location, can indicate inspection of a system, etc.

The process evaluation module 58 receives as input the current context 74. Based on the current context 74, the process evaluation module 58 determines a current step 76 of a process. For example, a process evaluation module 58 stores a predetermined process including a number of steps. Give the aircraft maintenance example, an aircraft maintenance process may include the steps of: 1) security check 2) transit to MCC 3) at MCC 4) transit to airplane location or bay 5) inspect the bay 6) marshal the plane 7) gather information (i.e., talks to pilot/refers to log book) 8) inspect the aircraft 9) perform repairs. The process evaluation module 58 selects a step from one of the steps as the current step 76 by matching the current context 74 to a context that is associated with the step.

The display manager module 60 receives as input the user selection 64, the system information 70, and the current step 76. The display manager module 60 manages the output to the user provided by the display system 26 and/or the output devices 30 based on the inputs. In various embodiments, the display manager module 60 generates display data 78 for use by the display system 26 to display an interface. For example, the display manager module 60 stores various interfaces and their association with a step of the process. The display manager module 60 then determines an interface to be displayed by matching the current step 76 to the step associated with the interface. In some cases, if received, the user selection is used to determine the interface. In some cases, if the interface requires population of certain system information, the display manager module 60 provides the display status 66 to the data request communication module 54 which transmits the request data 71 to request the information and in turn, the wireless data 68 including the information 70 is received and processed.

Figure 3:
FIGS. 3-8 are illustrations of user interfaces that may be displayed by the context based information management system in accordance with various embodiments.
Figure 4:
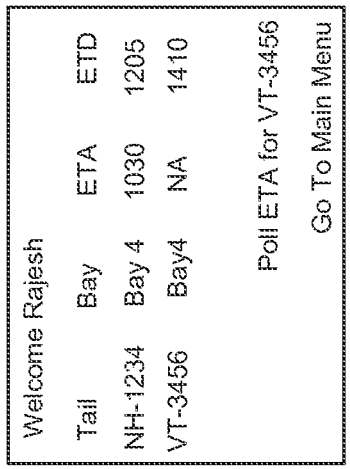
Figure 5:
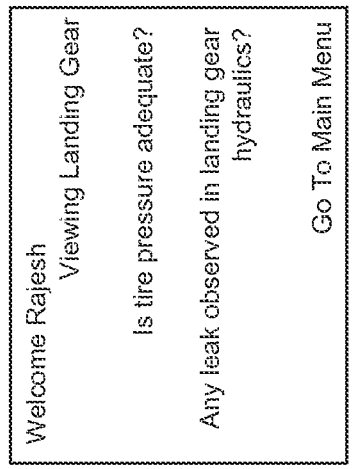
Figure 6:
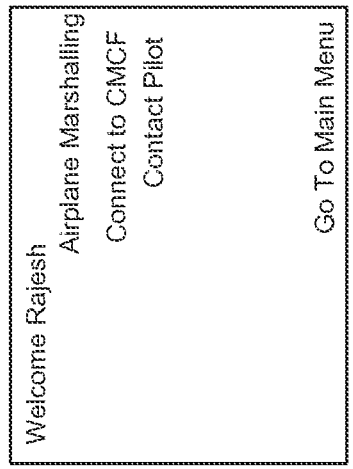
Figure 7:
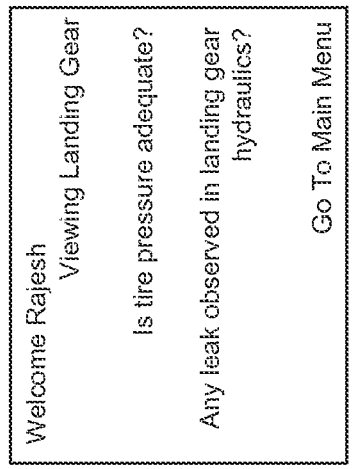
Figure 8:
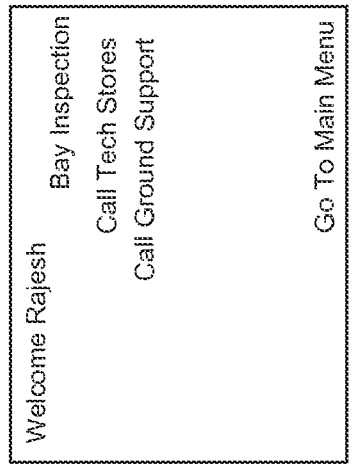

As shown in the examples of FIGS. 3-8, when the process is an aircraft maintenance process, the user interfaces may be selected from one of many user interfaces that include, but are not limited to, a default interface shown in FIG. 3, a maintenance schedule interface shown in FIG. 4, a plan menu interface shown in FIG. 5, a bay inspection interface shown in FIG. 6, an airplane marshaling interface shown in FIG. 7, and a maintenance checklist or guide as shown in FIG. 8. When the current step 76 indicates 1) security check or 2) transit to MCC, the display manager module 60 determines the current interface to be a maintenance schedule interface that displays a maintenance schedule requests for various aircraft. When the current step 76 indicates 3) at MCC the display manager module 60 determines the current interface to be a plan menu that displays selectable options to plan for tools, accessories, reference manuals, transportation, or other items needed in the maintenance process. When the current step 76 indicates 4) inspection at the bay, the display manager module 60 determines the current interface to be a bay inspection interface that displays selectable options to coordinate with stores or services. When the current step 76 indicates 5) aircraft marshaling, the display manager module 60 determines the current interface to be component checklist or guide that displays information on the system or part of the aircraft that the user is viewing.

Figure 9:
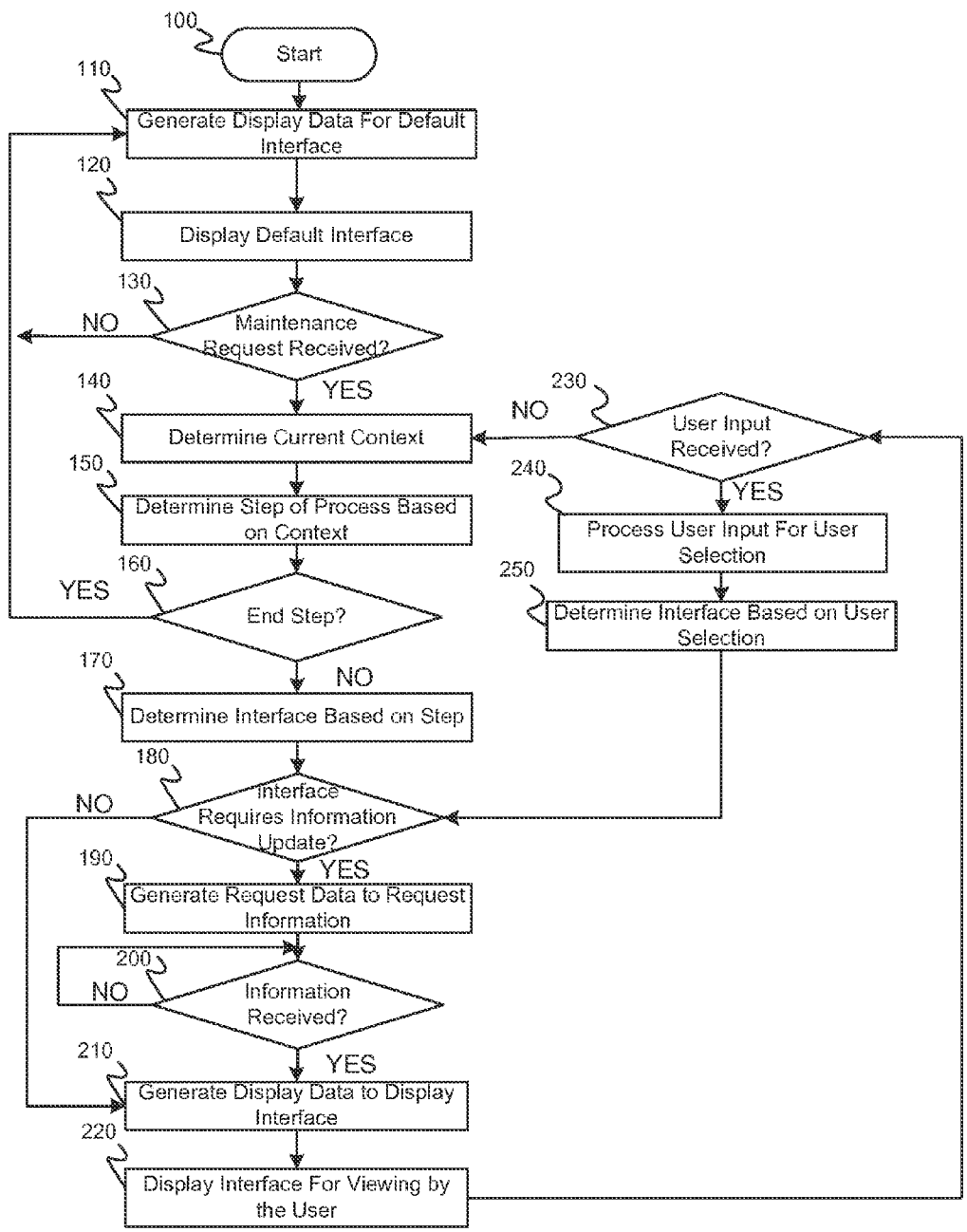
FIG. 9 is a flowchart illustrating a context based information management method that may be performed by the context based information management system in accordance with exemplary embodiments.

Referring now to FIG. 9, and with continued reference to FIGS. 1-8, a flowchart illustrates a method that can be performed by the system in accordance with the present disclosure. As can be appreciated in light of the disclosure, the order of operation within the method is not limited to the sequential execution as illustrated in FIG. 9, but may be performed in one or more varying orders as applicable and in accordance with the present disclosure. As can further be appreciated, one or more steps may be added or removed from the method shown in FIG. 9, without altering the spirit of the method.

In various embodiments, the method can be scheduled to run based on predetermined events, and/or can run continually during operation of the wearable device 16.

The method may begin at 100. The display manager module 60 generates the display data 78 to display the default interface (FIG. 3) at 110. The display system 26 displays the default interface at 120. It is determined whether a maintenance request is received at 130. Once a maintenance request is received at 130, the context detection module 56 determines the current context 74 based on the sensor data 72 at 140. The maintenance process evaluation module 58 evaluates the current context 74 to determine the current step 76 of a maintenance process at 150. If the current step 76 is an end step (i.e., the maintenance process is complete), then the method continues with generating the display data for the default interface at 110. If however, the current step 76 is not an end step at 160, the display manager module 60 determines an interface based on the current step 76 at 170.

It is determined whether the interface requires an information update at 180. If the interface does not require an information update at 180, the display manager module 70 generates the display data 71 to display the interface at 210; and the display system 26 displays the interface to the user at 220. If, however, the interface requires an information update at 180, the request data 71 is generated to request the information at 190. Once the information 70 is received (wirelessly via wireless data 68) at 200, the display manager module 60 generates the display data 78 by populating the interface with the received information 70 at 210; and the display system 26 displays the user interface to the user at 220.

It is determined whether user input data 62 is received in response to displaying the interface at 230. If user input data 62 is received in response to the interface at 230, the user input processing module 50 processes the user input data 62 to determine the user selection 64 at 240. The next user interface is determined based on the current step 76 and the user selection 64 at 250. Thereafter, the method proceeds back to 180 where it is determined whether the interface requires an information update. If the interface does not require an information update at 180, the display manager module 60 generates the display data 78 to display the interface at 210. If the interface requires an information update at 180, request data 71 is generated to request the information at 190. Once the information is received (wirelessly via wireless data 68) at 200, the display manager module 60 generates the display data 78 by populating the interface with the received information 70 at 210. The display system 26 displays the user interface to the user at 220.

If, at 230, user input data 62 is not received, the method proceeds to 140 where the current context 74 is determined and then the current step 76 is determined based on the context at 150. The method continues until the end step of the maintenance process has been reached. In which case, the method continues with generating the display data to display the default screen at 110.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for managing content displayed by a wearable device as it is being worn by a user, comprising:
   determining a current context of the wearable device based on a current environment that is sensed by the wearable device as it is being worn by the user;
   determining a step of an aircraft maintenance process based on the context;
   determining a maintenance interface based on the step of the process, the maintenance interface including maintenance information relating to the step of the aircraft maintenance process; and
   generating display data to display the interface by the wearable device to the user.

2. The method of claim 1 further comprising:
   generating a request for information based on the context; and
   transmitting the request to a system that stores information relating to the process.

3. The method of claim 1 further comprising:
   receiving information from a system that stores information relating to the process based on the context, wherein the generating the display data is based on the information.

4. The method of claim 1 wherein the determining the current context is based on a location of the wearable device.

5. The method of claim 1 wherein sensed data indicating the current environment includes image data.

6. The method of claim 1 further comprising receiving user input and wherein the determining the interface is based on the user input.

7. A system for managing content displayed by a wearable device as it is being worn by a user, comprising:
a wearable device comprising a display device and at least one input device that accepts user input,
wherein the wearable device is configured to determine a current context of the wearable device based on a current environment that is sensed by the wearable device as it is being worn by the user; determine a step of an aircraft maintenance process based on the context; determine a maintenance interface based on the step of the process, the maintenance interface including maintenance information relating to the step of the aircraft maintenance process; and generate display data to display the interface by the wearable device to the user.

8. The system of claim 7 wherein the wearable device is further configured to generate a request for information based on the context, and transmit the request to a system that stores information relating to the process.

9. The system of claim 7 wherein the wearable device is further configured to receive information from a system that stores information relating to the process based on the context, and wherein the wearable device is configured to generate the display data based on the information.

10. The system of claim 7 wherein the wearable device is configured to determine the current context based on a location of the wearable device.

11. The system of claim 7 wherein sensed data indicating the current environment includes image data.

12. The system of claim 7 wherein the wearable device is configured to receive user input from the at least one input device, and wherein wearable device is configured to determine the interface based on the user input.

13. The system of claim 12 wherein the at least one input device is a recording device or a touch sensor.

14. The system of claim 7 wherein the wearable device is at least one of eyewear, jewelry, a hair accessory, an article of clothing, and footwear.

* * * * *